(12) United States Patent
Feinstein

(10) Patent No.: US 8,881,347 B2
(45) Date of Patent: Nov. 11, 2014

(54) VIBRATION AND PRESSURE DAMPING DEVICE FOR GRIPPING HANDLES AND STEERING MECHANISMS

(75) Inventor: Peter A. Feinstein, Shavertown, PA (US)

(73) Assignee: Feinstein Patents LLC, Shavertown, PA (US)

( * ) Notice: Subject to any disclaimer, the term of this patent is extended or adjusted under 35 U.S.C. 154(b) by 223 days.

(21) Appl. No.: 13/594,301

(22) Filed: Aug. 24, 2012

(65) Prior Publication Data

US 2014/0053371 A1  Feb. 27, 2014

(51) Int. Cl.
*B25G 1/10* (2006.01)

(52) U.S. Cl.
USPC .............................................. 16/431; 16/430

(58) Field of Classification Search
USPC ............. 16/431, 430, 421, DIG. 12, DIG. 18, 16/DIG. 19, 444; 81/489, 177.1; 74/543, 74/551.1, 551.8, 551.9, 558.5; 273/75, 273/73 J, 67 DA; 473/300, 301, 552, 568; 173/162.1, 162.2, 211, 136.1, 162, 136
See application file for complete search history.

(56) References Cited

U.S. PATENT DOCUMENTS

| | | | |
|---|---|---|---|
| 587,388 A | 8/1897 | Conard | |
| 593,162 A | 11/1897 | Miller | |
| 2,913,923 A | 11/1959 | Wilson | |
| 3,308,494 A | 3/1967 | Licher | |
| 3,417,722 A * | 12/1968 | O'Neill | 114/277 |
| 4,421,181 A | 12/1983 | Andersson et al. | |
| 4,509,228 A * | 4/1985 | Landsberger | 16/426 |
| 4,547,919 A * | 10/1985 | Wang | 428/116 |
| 4,912,861 A * | 4/1990 | Huang | 36/29 |
| 5,018,733 A * | 5/1991 | Buand | 473/550 |
| 5,142,717 A * | 9/1992 | Everard et al. | 5/709 |
| 5,207,713 A | 5/1993 | Park | |
| 5,345,609 A * | 9/1994 | Fabry et al. | 2/20 |
| 5,355,552 A | 10/1994 | Huang | |
| 5,355,705 A | 10/1994 | Schulze et al. | |
| 5,713,104 A * | 2/1998 | Giampaolo, Jr. | 16/422 |
| 5,846,629 A * | 12/1998 | Gwinn | 428/68 |
| 5,987,705 A | 11/1999 | Reynolds | |

(Continued)

FOREIGN PATENT DOCUMENTS

| | | |
|---|---|---|
| DE | 102006043685 A1 * | 3/2008 |
| EP | 1127529 A1 | 8/2001 |

(Continued)

OTHER PUBLICATIONS

Manes; "Prevalence of Carpal Tunnel Syndrome in Motorcyclists"; Orthopedics; May 2012; vol. 35, No. 5; pp. 399-400.

(Continued)

*Primary Examiner* — Chuck Mah
(74) *Attorney, Agent, or Firm* — St. Onge Steward Johnston & Reens LLC

(57) ABSTRACT

A damping device for a handgrip of an object includes a bladder disposed in said handgrip, an inflation device in fluid communication with the bladder, and a controller adapted to detect at least one of vibrations and impact pressure, and automatically adjust a cushion pressure of said bladder by causing the inflation device to inflate or deflate the bladder with a fluid as appropriate in order to attenuate the at least one of vibrations and impact pressure transmitted through said handgrip.

30 Claims, 11 Drawing Sheets

(56) References Cited

U.S. PATENT DOCUMENTS

| | | | |
|---|---|---|---|
| 6,112,618 A * | 9/2000 | Yates | 74/551.9 |
| 6,220,630 B1 | 4/2001 | Sundholm et al. | |
| 6,237,193 B1 * | 5/2001 | Skerker et al. | 16/430 |
| 6,382,661 B1 | 5/2002 | Sutherland | |
| 6,460,237 B1 * | 10/2002 | Tsiguloff | 29/235 |
| 6,648,367 B2 | 11/2003 | Breed et al. | |
| 6,821,218 B2 * | 11/2004 | Byrne et al. | 473/568 |
| 6,893,044 B2 | 5/2005 | Holmes et al. | |
| 7,476,207 B2 * | 1/2009 | Porrata et al. | 602/13 |
| 7,481,455 B2 | 1/2009 | Iida et al. | |
| 7,954,399 B2 | 6/2011 | Rubboli | |
| 2005/0257944 A1 * | 11/2005 | Cooper | 173/217 |
| 2010/0212453 A1 | 8/2010 | Rouillard | |
| 2010/0223760 A1 | 9/2010 | Henke et al. | |
| 2010/0282018 A1 | 11/2010 | Bazinski | |

FOREIGN PATENT DOCUMENTS

| | | | |
|---|---|---|---|
| EP | 1785097 A2 | | 5/2007 |
| JP | 58183349 A | | 10/1983 |
| JP | 1178078 A | | 7/1989 |
| JP | 09156512 A | * | 6/1997 |
| JP | 2003180776 A | * | 7/2003 |

OTHER PUBLICATIONS

International Search Report and Written Opinion of the International Searching Authority Application No. PCT/US2013/044298 Completed: Oct. 15, 2013; Mailing Date: Oct. 24, 2013 9 pages.

* cited by examiner

VIBRATION AND PRESSURE DAMPING DEVICE FOR GRIPPING HANDLES AND STEERING MECHANISMS

FIELD OF THE INVENTION

This invention relates to vibration damping devices and more specifically, to an apparatus that dampens vibrations and pressure transmitted through gripping handles and steering mechanisms to a person's fingers, hands, wrists, elbows, arms and shoulders.

BACKGROUND OF THE INVENTION

The ulnar and median nerves—two of the three major nerves in the arm—are largely unprotected by muscles or bone. As a result, these nerves are prone to injury. Biker's Palsy, also known as Cyclist's Palsy and Handlebar Palsy, and Carpal Tunnel Syndrome (CTS) are two types of injuries caused by the compression of the ulnar and median nerves in the wrists. Both injuries are prevalent among cyclists and bikers because of the repetitive motion, vibration, and pressure exerted on their wrist joints for extended periods of time. However, these nerve injuries are also common in individuals who regularly grip or expose their hands to vibrating or impacting objects, such as steering wheels and handlebars of motor vehicles (e.g., cars, trucks, motorcycles, all-terrain vehicles), sports/recreational equipment (e.g., baseball bat, golf club, tennis racket), and construction machinery and tools (e.g., jackhammers, riveters, chain saws, hammers). Individuals whose hands are regularly exposed to repetitive motion, vibrations and pressure may also suffer from other medical conditions, including medial and lateral epicondylitis in the elbow, such as tennis elbow and golfer's elbow, De Quervain's tenosynovitis in the thumb and wrist area, calcific and bicipital tendinitis, and other impingement injuries experienced while serving in tennis or swinging in golf.

In order to prevent or reduce the likelihood of Biker's Palsy and CTS, damping devices have been developed to attenuate the vibrations transmitted through handles and steering mechanisms. Some of these devices incorporate a gas-filled bladder mounted to the surface of the vibrating handlebar or handgrip. One such device is described in U.S. Pat. No. 5,355,552 to Huang. Huang discloses a shock-absorbing air cushion grip which can be fixed around the handle of a tennis racket, hammer, bicycle, or a steering wheel. The grip has a cubic support structure with a plurality of air cells that can be isolated or be in fluid communication with each other. However, this apparatus does not provide a secure means for the grip to remain in stationary contact with the handle of the vibrating object. Specifically, the air cushion grip can rotatably move about the handle while it is grasped by a hand, and thereby diminishes the user's ability to maneuver or control the vibrating object. Further, the air cushion grip is equipped with only a one-way manually-compressible pump to inflate the air cells. Further still, the air-cushion grip lacks the capability to adjust, in real-time, the damping levels of the air cells in order to accommodate the different vibrations and/or shocks that the object and its handle experience.

U.S. Pat. No. 5,987,705 to Reynolds describes a vibration damping covering that attaches to a vibrating handlebar. The covering comprises a bladder having a plurality of independent or interconnected inflation cells filled with fluid, a tube for attaching an external pumping device, and a sensor for indicating when proper inflation pressure has been reached. The design of the covering, however, has several drawbacks. The covering does not integrate an inflation device to expand or contract the inflation cells. Also, the covering is not adapted to provide real-time, continuous adjustments of the damping level provided by the covering. Vibrations and impacts can vary in their frequency and amplitude, and as such, a single pressure damping level may not be sufficient in protecting a user's fingers, hands, wrists, arms, elbows and shoulders (herein "upper extremities").

U.S. Pat. No. 4,421,181 to Andersson et al. is directed to a vibration damping arrangement having an air-tight chamber containing a gas at a pressure higher than ambient or atmospheric pressure. The chamber is glued to the surface of a vibrating handlebar and has a grip layer wrapped around the chamber. In some embodiments, more than one chamber is glued to the handle. However, the arrangement does not include an integrated gas inflation device or a control unit to adjust damping levels of the chamber based on vibration characteristics (e.g., frequency, amplitude) and the strength of the user's grip (i.e., the amount of pressure applied to the chamber when the user is gripping the chamber). Where multiple gas-filled chambers are involved, Andersson teaches that all chambers have the same internal pressure. Accordingly, the damping arrangement does not allow for independent configuration of the chambers and fails to provide localized damping, wherein different sections of the handlebar are provided different levels of vibration damping. Moreover, Andersson is not adapted to provide for real-time adjustments of the damping levels of the air-tight chamber.

U.S. Patent Application Publication No. 2010/0212453 to Rouillard et al. discloses a handlebar vibration reducing grip having an outer tubular element, an inner tubular element disposed within the outer tubular element, and a plurality of deformable ribs for coupling the inner and outer tubular elements together. The grip further incorporates gas-filled compartments formed between the ribs, inner tubular element, and outer tubular element. The vibrations transmitted by the handlebar are reduced by the deformation of the ribs as well as the deformation of the compartments and compression of the gas disposed therein. This design of a vibration reducing device has several drawbacks. The deformable ribs prevent the grip from providing sufficient damping for a range of vibrations—varying in frequency and amplitude—that may be exerted on the upper extremities. Further, the grip does not include an inflation device to adjust the volume of gas contained in the compartments. As such, the pressure levels of the compartments remain constant and therefore are not adapted to provide varying damping effects. The vibration reducing grip also does not remain stationary with respect to the handlebar. The grip can rotate about the handlebar while the hands are grasping the grip, which reduces the user's ability to control the vibrating object.

While the prior art damping devices attached on the outer surfaces of handlebars of vibrating objects provide some vibration attenuating benefits compared to the handlebars alone, they still suffer from several disadvantages. One such disadvantage is that these "exterior" damping devices may not remain rotatably stationary while mounted to the handlebars, and thus, may affect a person's ability to maneuver the vibrating object. Further, the damping devices, when properly filled with gas, may substantially increase the overall size (i.e., perimeter) of the handlebar. This makes gripping the handlebar, and in turn controlling the vibrating object, difficult. Another disadvantage of the prior art damping devices is that they fail to provide continuous, real-time adjustments of damping levels or cushion pressure to sufficiently protect the upper extremities from different forms of vibration. As such, the prior art damping devices provide limited vibration damping benefits at the expense of adequate control over the vibrating object.

SUMMARY OF THE INVENTION

Accordingly, it is an object of the present invention to provide a vibration and impact pressure damping device which is adapted to be applied to handlebars and handgrips of a broad range of hand-operated devices, including sports/recreation equipment, construction machinery and tools, vehicle handgrips, and other steering devices.

It is another object of the present invention to provide a damping device which attenuates vibrations and impact pressure exerted on the fingers, hands, wrists, elbows, arms, and shoulders of an operator holding the handgrip of an object which is exposed to vibrations, impacts, and/or shocks during normal use.

It is yet another object of the present invention to provide a damping device which protects an operator's upper extremities against the vibrations and impact pressure transmitted thereto from a handgrip without adversely affecting the operator's ability to control and maneuver the handgrip. Noted herein, the term "upper extremities" includes a person's fingers, hands, wrists, elbows, arms, and shoulders.

It is a further object of the present invention to provide a vibration and pressure damping device which is adapted to continuously adjust a cushion pressure or damping level to sufficiently attenuate the range of vibrations and impacts transmitted through the handgrip of a vibrating object.

These and other objectives are achieved by providing a damping device for a handgrip of a vibrating object that has a bladder disposed in the handgrip, an inflation device in fluid communication with the bladder, and a controller adapted to detect at least one of vibrations and impact pressure and automatically adjust a cushion pressure of said bladder by causing the inflation device to inflate or deflate the bladder with a fluid as appropriate in order to attenuate the at least one of vibrations and impact pressure transmitted through said handgrip and provide cushion to upper extremities. The damping device, accordingly, helps reduce fatigue in the upper extremities as well as mitigates ulnar and median neuropathy, medial and lateral epicondylitis in the elbow (i.e., tennis elbow and golfer's elbow), De Quervain's tenosynovitis in the thumb and wrist area, calcific and bicipital tendinitis, and other impingement injuries in the upper extremities.

Further objectives are achieved by providing a damping device for a handgrip of a vibrating object having a bladder disposed within the interior of a handgrip, an inflation device in fluid communication with the bladder, and a controller adapted to detect at least one of vibrations and impact pressure and automatically adjust a cushion pressure of said bladder by causing the inflation device to inflate or deflate the bladder with a fluid, wherein said handgrip has at least one aperture for accommodating the bladder. The bladder is adapted to expand out or contract from said handgrip, relative to an axis of the handgrip, through said aperture when the bladder is inflated or deflated, respectively. In some situations, the bladder is substantially flush with the outer surface of the handgrip. In other situations, the bladder may be raised or protrude above the surface of the handgrip. Still, in other embodiments, the bladder may be recessed relative to the handgrip.

The at least one aperture extends a portion of the handgrip. More specifically, the aperture can extend along the length of the handgrip. Where the handgrip has a circular or arc shaped profile, such as a steering wheel, the aperture extending along the length of the handgrip is equivalent to the aperture extending along the circumference of the handgrip. In other embodiments, the aperture extends at least partially around the perimeter (periphery) of the handgrip.

In some embodiments, the at least one aperture comprises between 20% and 80% of said handgrip. This means that between 80% and 20% of the original periphery of the handgrip remains. Regardless of the percentage in which the aperture comprises the periphery of the handgrip, the structural integrity, stability, and control of the handgrip over the object remain intact.

The damping device according to the present invention sufficiently attenuates the vibrations and impact pressure transmitted through a handgrip by providing a damping device having at least one bladder disposed in the handgrip, said bladder being inflated with fluid, wherein the handgrip has a plurality of apertures for accommodating the at least one bladder. The apertures may be disposed in different locations of the handgrip in order to focus and concentrate the cushion protection at certain points along the hands of a person gripping the vibrating object. For example, the apertures may be placed in positions which align with the fingers. In another example, the apertures may be placed so that they are substantially aligned with the palm of the hand.

Further, the one or more bladders may be adapted to expand outward or contract inward with respect to an axis of the handgrip. In some embodiments, the bladder may expand out from a central axis of the handgrip towards the fingers of the operator gripping the bladder and handgrip, and contract in towards the central axis away from the fingers. In alternate embodiments, the bladder may expand out from the central axis of the handgrip towards the palms and contract in towards the central axis away from the palm.

The damping device according to the present invention may also have a grip layer disposed on an exterior of the bladder. The grip layer is designed to provide a frictional surface substantially similar to that of the handgrip so that the hand can equally grasp the bladder and handgrip. This feature helps maintain the overall grip characteristics of the handgrip despite having an aperture. Further, the grip layer has a firmness greater than the surface of the bladder so that said firmness is substantially consistent with that of the handgrip. The grip layer thus provides a uniform feel between the bladder and the handgrip. Moreover, the grip layer expands and contracts with the bladder. The grip layer does not inhibit the bladder's ability to expand or contract when fluid is inserted into or removed from the bladder.

Other objectives are achieved by providing a damping device for a handgrip of a vibrating object having a bladder disposed in the handgrip, an inflation device in fluid communication with the bladder, and a controller adapted to detect at least one of vibrations and impact pressure and adjust in real-time a cushion pressure of said bladder by causing the inflation device to inflate or deflate the bladder with a fluid, wherein the inflation device is removably attached to the handgrip. In other embodiments, the inflation device may be removably attached to another part of the object. In some embodiments, the inflation device comprises a disposable/replaceable pressurized gas cartridge. Having a small and lightweight characteristic, the pressurized gas cartridge requires little space and can be disposed on or in the handgrip or any other part of the vibrating object. In other embodiments, the inflation device comprises a compressor, such as an air or gas compressor. In yet other embodiments, the air inflation device can comprise a hydraulic pump or piston. Other examples of pumps may also be used as the inflation device to inflate and deflate the bladder with fluid as appropriate to attenuate the vibrations and/or impact pressure.

Additional objectives are achieved by providing a damping device for a handgrip of a vibrating object having a bladder disposed in the handgrip, an inflation device in fluid communication with the bladder, and a controller adapted to detect at least one of vibrations and impact pressure and adjust a cushion pressure of said bladder by causing the inflation device to inflate or deflate the bladder with a fluid, wherein the inflation device is integrated into said object. In some embodiments, the inflation device is disposed in or near said handgrip.

Further objectives are achieved by providing a damping device which attenuates vibrations and impact pressure transmitted through a handgrip, the damping device including a bladder disposed in the handgrip, an inflation device, and a controller adapted to adjust a cushion pressure of the bladder by causing the inflation device to inflate the bladder, wherein the bladder comprises a plurality of inflatable compartments. Each compartment is in fluid communication with the inflation device. In some embodiments, the inflatable compartments are connected to each other, which allows for fluid in one compartment to flow freely to another compartment. In other embodiments, each compartment is isolated and has independent fluid communication with the inflation device.

Other objectives are achieved by providing a damping device for a handgrip of a vibrating object having a bladder disposed in said handgrip, at least one sensor disposed on or in the handgrip, said sensor being adapted to measure characteristics of vibrations and impact pressure (e.g., frequency, amplitude, wavelength, spectra, impulsiveness) transmitted though the handgrip, an inflation device in fluid communication with the bladder, and a controller for adjusting a cushion pressure of the bladder according to the measured characteristics. This configuration provides for continuous and real-time calculation of a damping level for the bladder that will sufficiently attenuate any type of vibrations and impact pressure that may be directed towards the upper extremities. In turn, the adjustments to cushion pressure or damping level may be based on characteristics of the vibrations and impact.

Additional objectives are achieved by providing a damping device for a handgrip of a vibrating object having at least one bladder disposed in the handgrip, the handgrip having a plurality of apertures for accommodating the bladder, the apertures being disposed substantially where each finger grips the handgrip, at least one inflation device in fluid communication with the bladder, and a controller adapted to detect at least one of vibrations and impact pressure and adjust a cushion pressure of the bladder by causing the inflation device to inflate or deflate the bladder with a fluid. In some embodiments, the apertures are configured such that they serve as finger grooves for the handgrip.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

DETAILED DESCRIPTION OF THE INVENTION

The following detailed description illustrates the invention by way of example, not by way of limitation of the principles of the invention. This description will enable one skilled in the art to make and use the invention, and describes several embodiments, adaptations, variations, alternatives and uses of the invention, including what is presently believed to be the best mode of carrying out the invention.

As used herein, the terms "upper extremity" and "upper extremities" encompasses the fingers, hands, wrists, arms, elbows and shoulders of a person.

Figure 1:
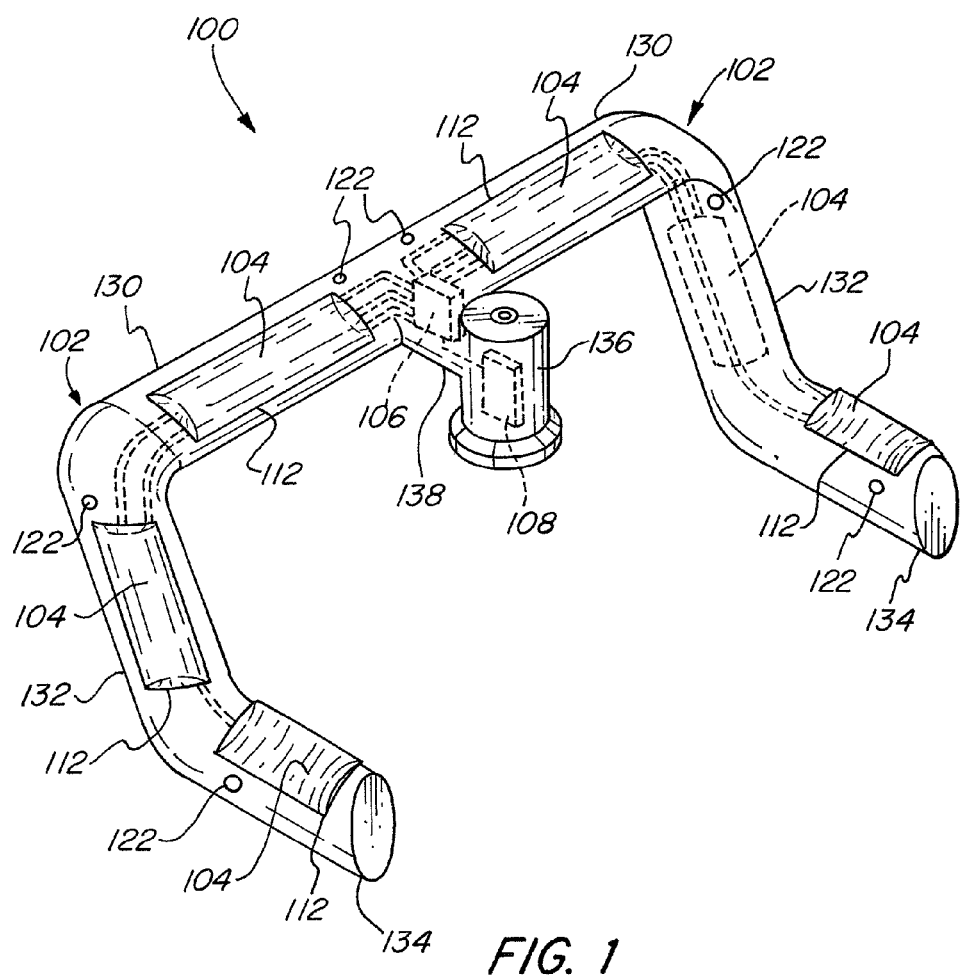
FIG. 1 is a perspective view of a damping device according to an exemplary embodiment of the present invention implemented into a handgrip of a bicycle.
Figure 2:
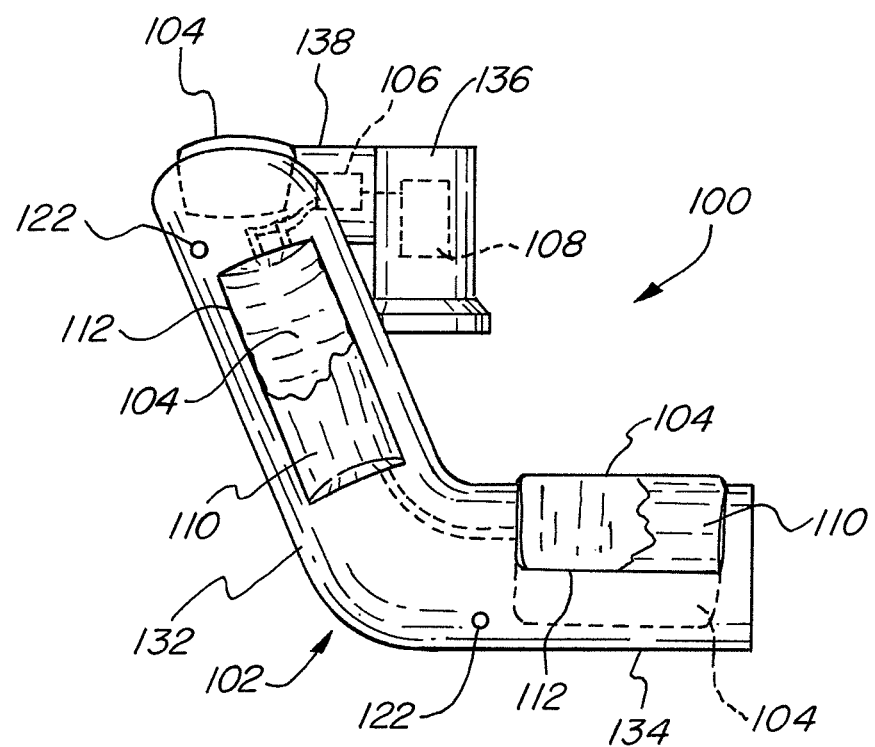
FIG. 2 is a side view of the damping device of FIG. 1 implemented into a handgrip of a bicycle.
Figure 3:
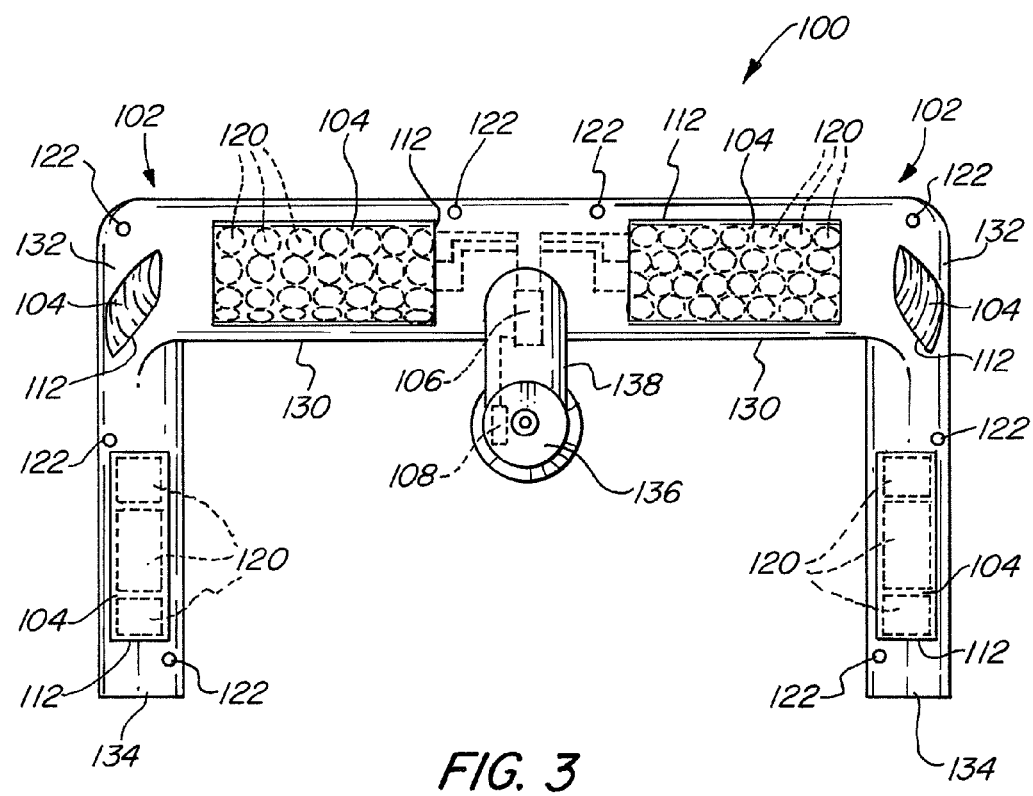
FIG. 3 is a top view of the damping device of FIG. 1 implemented into a handgrip of a bicycle.

Referring to the figures in detail and first to FIGS. 1-3, there is shown an exemplary embodiment of a damping device for protecting the upper extremities of a person ("operator") who is operating a vibrating object against vibrations, impact pressure, and shocks transmitted through the handgrip. The damping device 100 shown in FIG. 1 is implemented into the handgrip 102 of a bicycle. Although this figure and the following description of the present invention focuses on implementation of the damping device 100 on a handgrip of a bicycle, it will be understood that similar principles may be applied in a handgrip for other types of equipment and implements, such as vehicle steering mechanisms, golf clubs, baseball bats, jackhammers, and riveters. The damping device 100 includes at least one bladder 104 disposed in the handgrip 102, an inflation device 106, and a controller 108. In particular, the bladder 104 is disposed in the handgrip 102, and more specifically, within the core or walls of the handgrip 102. The inflation device 106 is in fluid communication with the at least one bladder 104 and is interfaced with the controller 108. The controller 108 manages the operation of the inflation device 106 in order to inflate or deflate the bladder 104. In one embodiment, the bladder 104 is made of a flexible, elastic material. For example, a flexible woven fabric material, such as polyamide, polyester or the like, can be used to construct the bladder 104. Other materials may be used to make the bladder 104, including rubber, latex, polychloroprene, nylon fabric, synthetic fabric, silicone, synthetic resin, or any combination of these. The above list of materials is merely exemplary and as such, the bladder 106 can comprise of other materials not listed herein. Regardless of the material used to make the bladder 104, it is air-tight and prevents any fluid from leaking out.

The bladder 104 expands or contracts, with respect to an axis of the handgrip 102, when the inflation device 106 begins to inflate a volume of fluid into bladder 104 or deflate the bladder 104, respectively. The material used to make the bladder 104 is also robust so that it can be inflated and deflated several times without losing its elastic properties. This feature of the damping device 100 provides for minimal maintenance and reduces the need to frequently replace the bladder 104.

By varying the amount of fluid within the bladder 104, the damping level or cushion pressure of the bladder 104 can be adjusted. Stated differently, by increasing or decreasing the volume of fluid, the compressibility of the bladder 104 can be modified. In particular, through the process of inflation or deflation, the bladder 104 can possess an ultra firm, firm, medium, soft, or ultra soft level of firmness. The bladder 104 can be adapted to vary the extent in which it attenuates the vibrations and impact pressure transmitted from the handgrip. Moreover, the bladder 104 helps to distribute force/load exerted on the operator's upper extremities as well as provide generally a comfortable cushion during the event of vibrations, impacts, and/or shocks thereto. As noted before, any expansion or contraction by the bladder 104 is performed relative to the longitudinal axis of the handgrip 102. Additional detail regarding the adjustment of damping level or cushion pressure of the bladder 104 is discussed further below.

FIG. 2 shows the bladder 104 being adapted with a grip layer 110 disposed on its exterior. The grip layer 110 provides a slip-free surface, or frictional surface, for the hands of the operator to easily maneuver and control the bladder 104 while it is incorporated into the handgrip 102. Therefore, the frictional surface of the grip layer 110 is sufficient for the hands to retain a grip of the bladder 104. The grip layer 110 is further adapted to provide a firmness that is consistent with the handgrip 102. As a result, the bladder 104 with the grip layer 110 provides a substantially uniform surface and a uniform feel with the outer surface of the handgrip 102. The grip layer 110 also provides for a comfortable surface for the operator's hands as they grasp the bladder 104. In addition to the above features, the grip layer 110 expands and contracts with the bladder 104. The grip layer 110 does not inhibit the inflation or deflation of the bladder 104. The grip layer 110 can be formed from silicone, rubber, or other like materials. In some embodiments, the grip layer 110 is integrated with the bladder 104. In other embodiments, the grip layer 110 may be removably attached to the exterior of the bladder 104.

The design of the bladder 104 can comprise various internal compartment configurations. In some embodiments, the bladder 104 has one single inflatable compartment 120. In other embodiments, the bladder 104 has a plurality of inflatable compartments 120 adapted to receive fluid from the inflation device 106, as illustrated in FIG. 3. The multiple inflatable compartments 120 provides for the bladder 104 to easily conform to any shape of the handgrip 102. Within a given bladder, all the compartments 120 can be of a standard uniform size and shape. However, the compartments 120 can be designed to have different shapes and sizes. Both configurations of inflatable compartments 120 (i.e., standard size compartments, different size compartments) enables the operator to tailor or customize the vibration damping effects according to the type of object in which the damping device is implemented.

The inflatable compartments 120 can be fluidly connected with each other. This allows movement of fluid between the inflatable compartments 120. Alternatively, the inflatable compartments 120 can each be isolated and fluidly independent. Each compartment 120 is adapted with an inlet which is in independent fluid communication with the inflation device 106. Given this arrangement, each inflatable compartment 120 can be inflated with a specific volume of fluid and given a distinct damping level. This enables the damping device 100 to provide a sufficient form of protection to the operator's upper extremities. Depending on the characteristics of the vibration, impact, or shock (e.g., frequency, amplitude, wavelength, period, waveform, spectra, impulsiveness), the damping device 100 can optimize the inflation of each individual compartment 120 of the bladder 104. As a result, different sections of a single bladder 104 can have different levels of cushion pressure and thus provide different vibration damping along the hand of the operator. For example, one form of cushion pressure can be applied to the part of the palm where the fingers meet while another form of cushion pressure can be applied to the part of the palm where the wrist meets. In another example, the bladder 104 can be adapted to focus its expansion towards or contraction away from the fingers, as opposed to the palm. The inflatable compartments 120 provide for damping protection to be localized or concentrated in particular sections of the bladder 104, and thereby affect how vibration and impact pressure is attenuated relative to the hands gripping the bladder 104. In order to determine the position of the driver's hands and locate the different parts of the hands (e.g., fingers, thumbs, palms), the damping device 100 may include a plurality of grip sensors for detecting pressure that is exerted on the bladder 104. The grip sensors may be embedded within the bladder 104 in some embodiments. In other embodiments, the grip sensors may be disposed on the handgrip 102, substantially near bladder 104 at the edge of aperture 112.

Having a plurality of independent inflatable compartments 120 disposed within the bladder 104 is also advantageous because the vibration and impact shock at one part of the handgrip may vary from the vibration and impact pressure felt at another part of the handgrip. As vibrations, impacts, and/or shocks travel along the length of the handgrip 102, their characteristics (e.g., frequency, amplitude, wavelength, period, waveform, spectra, impulsiveness) may change. This is especially true when vibrations are travelling through different mediums and materials in the handgrip 102. Thus, with the bladder 104 having a plurality of inflatable compartments 120, changes in vibration, impact, or shock characteristics can be taken into account when providing protection to the upper extremities.

Figure 4:
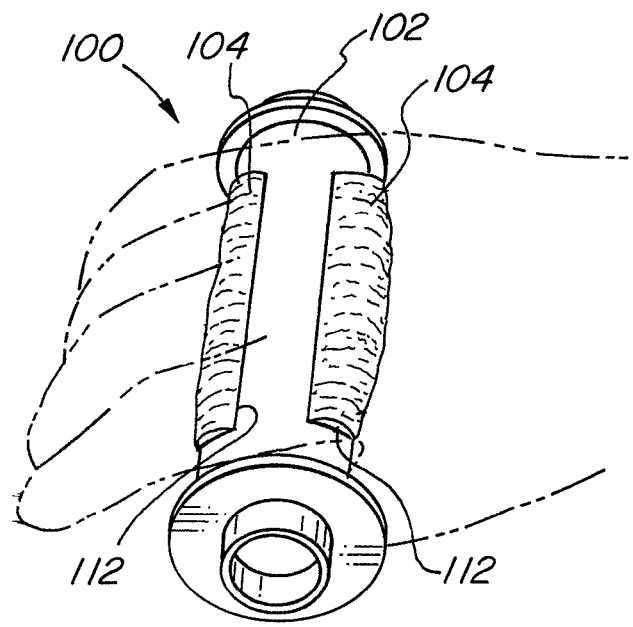
FIG. 4 is a perspective view of a damping device according to an exemplary embodiment of the present invention implemented into a handgrip of a bicycle.
Figure 5:
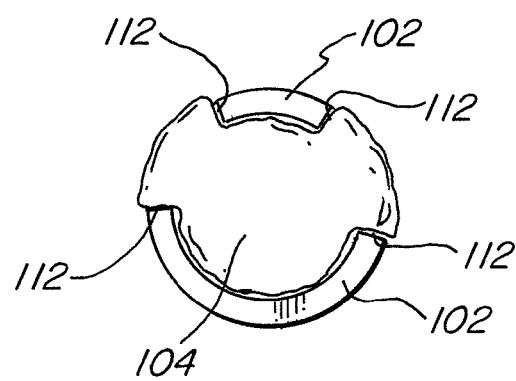
FIG. 5 is a cross-sectional view of the damping device of FIG. 4 implemented into a handgrip of a bicycle.

FIGS. 4-7, in addition to FIGS. 1-3, show the bladder 104 mounted and housed within the handgrip 102 of the bicycle (i.e., object susceptible to vibrations, impacts, and shocks during normal use). When the bladder 104 is placed within the handgrip 102, it dampens the vibrations and impact pressure transmitted through the object to the handgrip 102. The handgrip 102 is further adapted with at least one aperture 112, which provides an opening through which the bladder 104 is adapted to expand and contract upon being inflated and deflated, respectively, by the inflation device 106. The aperture 112 may be configured to extend along the length of the handgrip 102. In some embodiments, the aperture 112 may substantially extend the entire length of the handgrip 102, as shown in FIG. 4. In other embodiments, the handgrip 102 may be adapted with a plurality of apertures 112 disposed along its length. FIGS. 4-5 illustrate a handgrip 102 having two apertures 112 positioned such that the bladder 104 extends towards or contracts away from the fingers as well as extends towards or contracts away from the palm of the operator's hand. Referring to FIGS. 1-3, each handgrip 102 (left and right) has three apertures 112 disposed at various points. This particular setup provides vibration protection when the operator is either holding the horizontal handlebar 130 of the handgrip 102 or the vertical handlebar 132. Further, an aperture 112 is provided on the drop handlebar 134 of the handgrip 102. This particular aperture provides protection to the operator's upper extremities when the operator directly grips the drop handlebar 134. Alternatively, this aperture can provide protection to the operator's forearm when he grips the vertical handlebar 132 and lays his forearm against the drop handlebar 134.

Figure 6:
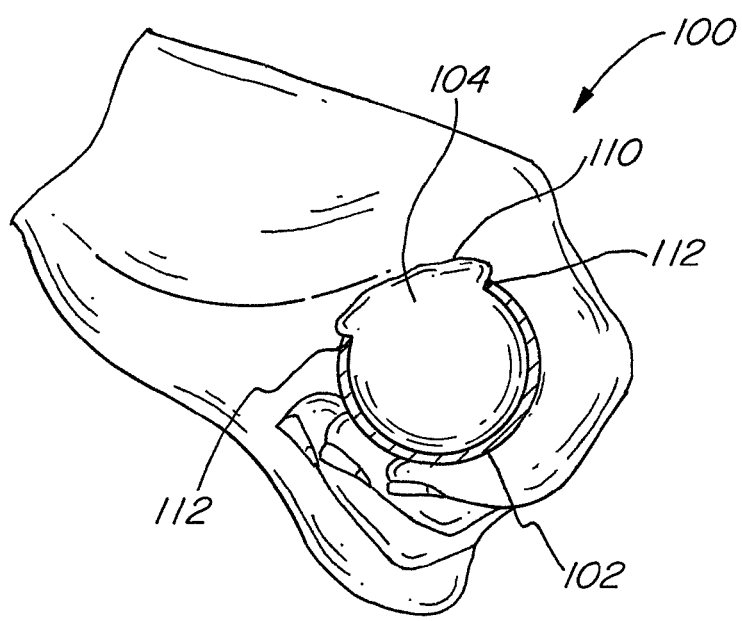
FIG. 6 is a side view of a damping device according to an exemplary embodiment of the present invention being gripped by a hand.

The aperture 112 in handgrip 102 may also be configured to extend along the perimeter (periphery) of the handgrip 102. Accordingly, the aperture 112 may encompass anywhere between 20% and 80% of the handgrip's periphery. For example, FIG. 6 shows an aperture 112 which makes up approximately 30% of the periphery of the handgrip 102. Even though the aperture 112 may comprise up to 80% of the handgrip 102, the structural rigidity and stability of the handgrip 102 is maintained. Further, the operator's ability to control and maneuver the handgrip 102 is not affected by the bladder 104.

Figure 7:
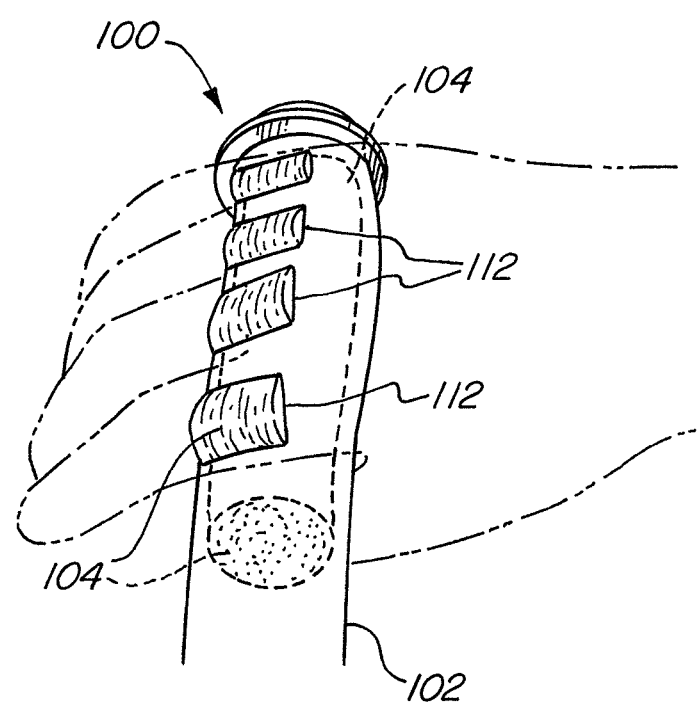
FIG. 7 is a perspective view of a damping device according to an exemplary embodiment of the present invention implemented into a handgrip of a bicycle.

FIG. 7 shows another example of the handgrip 102 having a plurality of apertures 112. Instead of extending the length of the handgrip 102, the apertures 112 extend substantially around the handgrip 102 and focus the damping protection provided via the bladder 104 along the operator's fingers. The apertures 112 in this configuration are also adapted to serve as finger grooves in the handgrip 102.

In some embodiments, the one or more apertures 112 are positioned in the handgrip 102 at a location which substantially aligns with a position of the operator's palm when holding onto the handgrip 102. These embodiments provide for the bladder 104 to expand towards (or contract away from) the palms. Accordingly, the cushion pressure, and thus protection, is directed mainly thereto. In other embodiments, the aperture 112 is positioned in the handgrip 102 at a location which aligns with the fingers. These embodiments provide for the bladder 104 to expand towards (or contract away from) the fingers, and thus, focuses the cushion pressure and protection at the fingers. In view of the above, the bladder is adapted to expand outward or contract inward with respect to an axis of the handgrip 102.

The manner in which bladder 104 is disposed within the handgrip 102 consists of inserting the bladder 104 through the aperture 112 and releasably mounting the bladder 104 to the interior of the handgrip 102. The contact between the bladder 104 (with the grip layer 110) and the interior of the handgrip 102 produces friction sufficient to fasten the bladder 104 in place. As such, the bladder 104 remains in a stationary position relative to the interior of the handgrip 102. In some embodiments, the grip layer 110 may also have fasteners to releasably secure the bladder 104 to the interior of the handgrip 102. One example of the fasteners is adhesive patches or layers which adhere to the inner surface of the handgrip 102. The fasteners prevent the bladder 104 from shifting within and separating from the handgrip 102 during inflation and deflation.

The above configuration of the damping device 100, wherein the bladder 104 is disposed within the handgrip 102, provides several advantages. First, the damping device 100, and specifically the bladder 104 does not substantially increase the overall size of the handgrip 102. This is important because the dimensions of handgrips are typically set such that they accommodate the average adult person's hands. Prior art damping devices must increase the overall size of handgrips in order to provide a sufficient level of vibration damping. The basic design of prior art damping devices, i.e., wrapping a bladder or chamber around the entire exterior of the handgrip, requires that the entire perimeter of the handgrip increase in size. This substantial increase in handgrip size reduces the operator's ability to adequately grasp the handgrip. In contrast, the damping device 100 according to the present invention provides vibration damping just by having the bladder 104 being disposed within the handgrip 102, without the bladder 104 necessarily expanding through the aperture 112 beyond the surface of the handgrip 102. Further, any expansion of the bladder 104 beyond the surface of the handgrip 102 is limited only to the areas of the aperture(s) 112 and not the entire perimeter of the handgrip 102 (FIGS. 5-6). Another advantage of the damping device 100 is that it does not interfere with the operator's ability to adequately control and/or maneuver the handgrip of an object that may be exposed to vibrations, impacts, or shocks. The damping device 100 according to the present invention still provides some contact between the operator's hands and the handgrip 102. Accordingly, the operator is able to maintain appropriate control over the handgrip and subsequently the vibrating object. Prior art damping devices, on the other hand, are designed to cover the entire handgrip. With no contact between the operator's hands and the handgrip itself, the operator may lose the capacity to properly control the vibrating object.

Generally, the one or more bladders 104 and the one or more apertures 112 are positioned in areas of the handgrip 102 where operators predominantly grasp or where contact with upper extremities (e.g., fingers, hands, wrists, arms, forearms, elbows) may occur. Accordingly, the damping device 100 is able to cushion the upper extremities and relieve pressure points that may cause Biker's Palsy or Carpal Tunnel Syndrome. The damping device 100 further provides relief from pressure points that may cause other medical conditions, such as medial and lateral epicondylitis in the elbow, De Quervain's tenosynovitis in the thumb and wrist area, calcific and bicipital tendinitis, and other impingement injuries experienced while serving in tennis or swinging in golf. The above list of injuries and medical conditions are exemplary, and it should be understood that the damping device 100 is able to reduce the likelihood of other nerve injuries and medical conditions affecting the upper extremities. It is noted that in some embodiments, a single bladder 104 may be used to provide protection at several apertures 112 (see FIGS. 4-5 and 7). In other embodiments, a bladder 104 may be inserted into each aperture 112 (see FIGS. 1-3).

Figure 8:
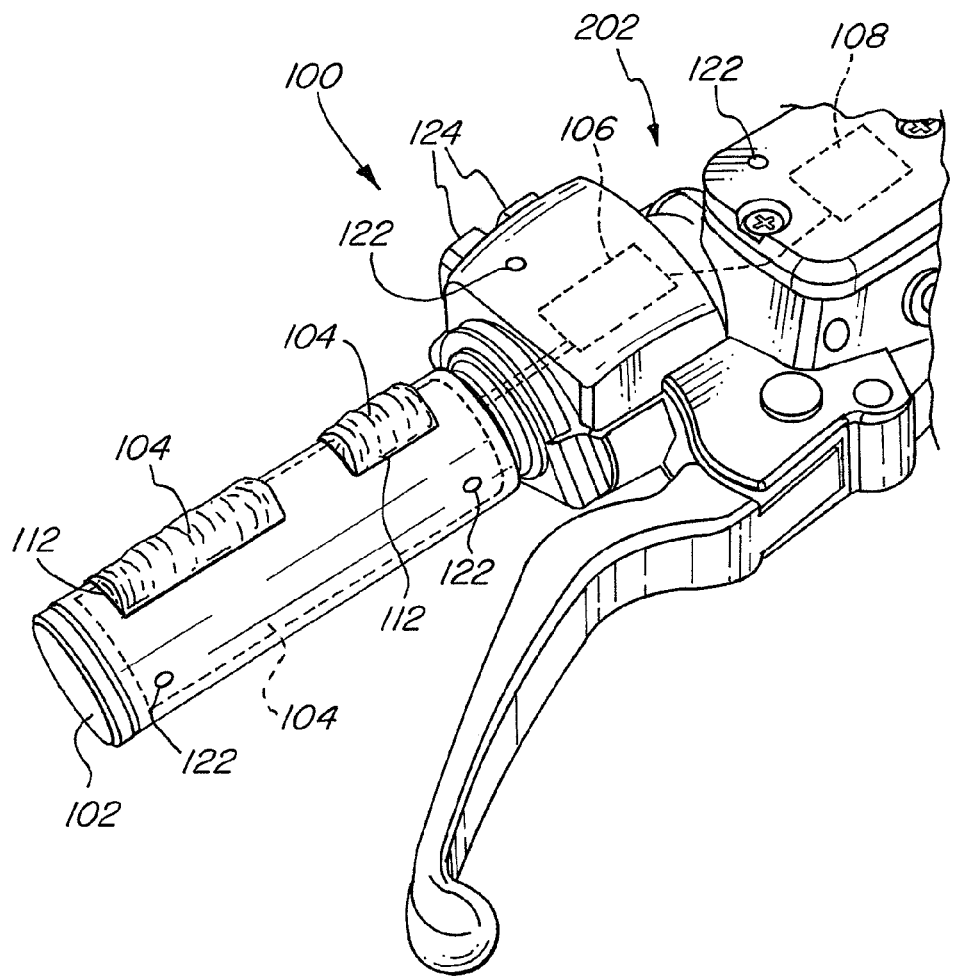
FIG. 8 is a perspective view of a damping device according to an exemplary embodiment of the present invention implemented into a motorcycle handgrip.
Figure 9:
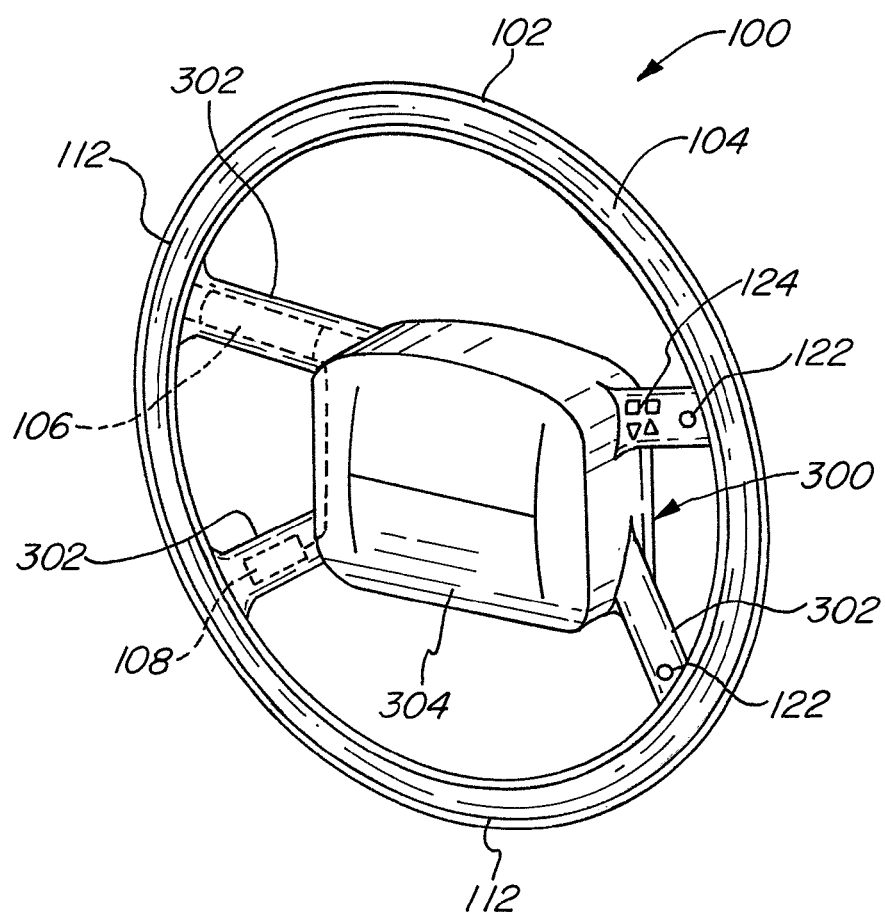
FIG. 9 is a perspective view of a damping device according to an exemplary embodiment of the present invention implemented into a vehicle steering wheel.

FIGS. 1-3 also show the damping device 100 having a controller 108. The controller 108 is adapted to detect and monitor at least one of vibrations, impacts, and shocks which the object experiences. In some embodiments, the controller 108 comprises a microcontroller. In other embodiments where the damping device 100 is implemented into a motor vehicle, including a car, truck, motorcycle, and all-terrain vehicle, the controller 108 comprises an electronic control unit. Generally, the controller 108 is small and can be implemented into the handgrip 102 or into any other part of the vibrating object. The controller 108 does not increase the overall size or alter the shape of the handgrip 102 or the object as a whole. For example, the controller 108 in FIG. 1 is disposed within the head tube or head set of the bicycle.

Wherein the damping device 100 is implemented in a motorcycle handgrip, the controller 108 can be disposed within the head tube or the standard instrument panel. Alternatively, the controller 108 can be positioned within the handlebars 202, as shown in FIG. 8. Where the damping device 100 is used with a vehicle steering wheel, the controller 108 can be disposed in one of the steering wheel spoke 302 or the steering hub 304 of the steering wheel 300, as shown in FIG. 9. While the controller 108 monitors the vibrations, impacts, and shocks, it collects characteristic data regarding the oscillations derived therefrom. The characteristic data which the controller 108 compiles includes frequency, amplitude, wavelength, period, waveform, spectra, and impulsiveness. Using this data, the controller 108 determines a volume of fluid and an inflation rate with which the inflation device 106 should inflate/deflate the bladders 104 to sufficiently attenuate the vibrations and impact pressure and protect the upper extremities. For example, the higher the amplitude of the vibration, the greater the cushion pressure of the bladder 104 (i.e., greater volume of fluid in the bladder 104) will be calculated by the controller 108. If the frequency of vibration is high, the controller 108 will determine a high inflation rate for the inflation device 106 to continuously adjust the cushion pressure of the bladder 104.

Further, the controller 108 may comprise a memory unit to store historical data on the vibrations and impacts with which the object and handgrip has been subjected. This historical data may also be taken into account by the controller 108 in determining the necessary vibration damping and attenuation. As one example, the longer the operator continuously uses the object in one single instance, the operator's upper extremities may suffer from fatigue, and in turn, may require increased vibration damping and protection. In another example, if the general trend of the vibrations exhibit increasing amplitude with time, then the controller 108 can adjust accordingly and cause the inflation device 106 to inflate additional fluid into the bladder 104 for increased protection. Alternatively, if the general trend of the vibrations exhibit decreasing amplitude with time, the controller 108 may reduce the amount of fluid contained in the bladder 104 (i.e., deflate the bladder) while still providing sufficient protection to the upper extremities.

In some embodiments, the controller 108 may be programmed with a feedback control system, such as proportional control, proportional-derivative control, proportional-integral control, or proportional-integral-derivative (PID) control. In other embodiments, the control system architecture used may be adaptive. In yet other embodiments, the controller 108 utilizes an intelligent control system. Still other types of control systems may be implemented in the controller 108. Regardless of the control system used, the controller 108 achieves continuous, real-time adjustments of the bladder 104 in order to provide constant comfort for the upper extremities and constant attenuation of any vibrations, impacts, and shocks that are transmitted through the object to the handgrip 102.

The controller 108 may further be adapted to save one or more operator settings/preferences with respect to cushion pressure and damping levels for the bladder 104. Thus, the controller 108 can be programmed with a plurality of preset damping or firmness levels for the bladder 104. Using a button or control pad connected to the controller 108, the operator is able to quickly select a saved setting and immediately configure the damping device 100 to his or her preferences. Similarly, the controller 108 may also save settings related to the environment in which the object is used. The environment in which the object is used can provide important information as to the potential vibrations, impacts, and shocks the object will be exposed. For example, in the case of a bicycle, the vibrations generated when riding the bike on a paved road, gravel, sand, grass, rocky terrain or wooded terrain all differ. The vibrations generated while riding the bike on gravel will generally be greater in amplitude and frequency than the vibrations generated while riding the bike on a paved road.

The controller 108 may also have a selector or selector 124, as shown in FIGS. 8-9. Using the selector 124, the operator has the ability to manually turn on or off the damping device 100. Alternatively, using the selector 124, the operator can configure the damping device 100 to provide a constant, steady cushion pressure. The selector 124 may be disposed on or near the handgrip 102 so that the operator does not have to remove his or her hands from the handgrip in order to manipulate the selector 124.

The selector 124 of the controller 108 also provides means for the operator to manually initiate inflation/deflation of the bladder 104. The operator can, therefore, increase or decrease the cushion pressure and adjust the damping level of the bladder 104 to his or her current preferences. In some embodiments, the selector 124 may comprise a plurality of push buttons. In other embodiments, the selector 124 may comprise at least one turn knob, wherein the rotation of the knob in one direction inflates the bladder 104 while rotation of the knob in the opposite direction deflates the bladder 104. The selector 124 may comprise a microchip embedded within the bladder or on the handgrip in some embodiments. In yet other embodiments, the selector 124 may include piezoelectric switch technology to provide necessary switch/select functionalities.

Communication between the controller 108 and the inflation device 106 can be implemented through an electrical signal cable. In other embodiments, the controller 108 and the inflation device 106 each have transmitter-receiver units, which provide for wireless communication therebetween. For example, the controller 108 and the inflation device 106 may communicate with each other using radio frequency communication (e.g., radio frequency identification), infrared short-range communication or Bluetooth. Similarly, communication between the controller 108 and the selector 124 may be achieved through wired communication or wireless communication.

As shown in FIGS. 1-3, the damping device 100 includes the inflation device 106 in fluid communication with the bladder 104. Upon receiving a signal from the controller 108, the inflation device 106 either inflates or deflates the bladder 104 to adjust the cushion pressure and damping level of the bladder 104. Further, where the bladder 104 has multiple independent inflatable compartments 120, the inflation device 106 is independently connected to each compartment 120. The inflation device 106 can alter the cushion pressure of each inflatable compartment 120 individually. This enables the bladder 104 to provide localized or concentrated vibration damping protection to the upper extremities. In addition, the damping device 100 may be adapted with more than one inflation device 106 in some embodiments. With such configuration, each inflation device may be fluidly connected to one bladder 104—and to each of the inflatable compartments therein—present in the damping device 100.

Figure 12:
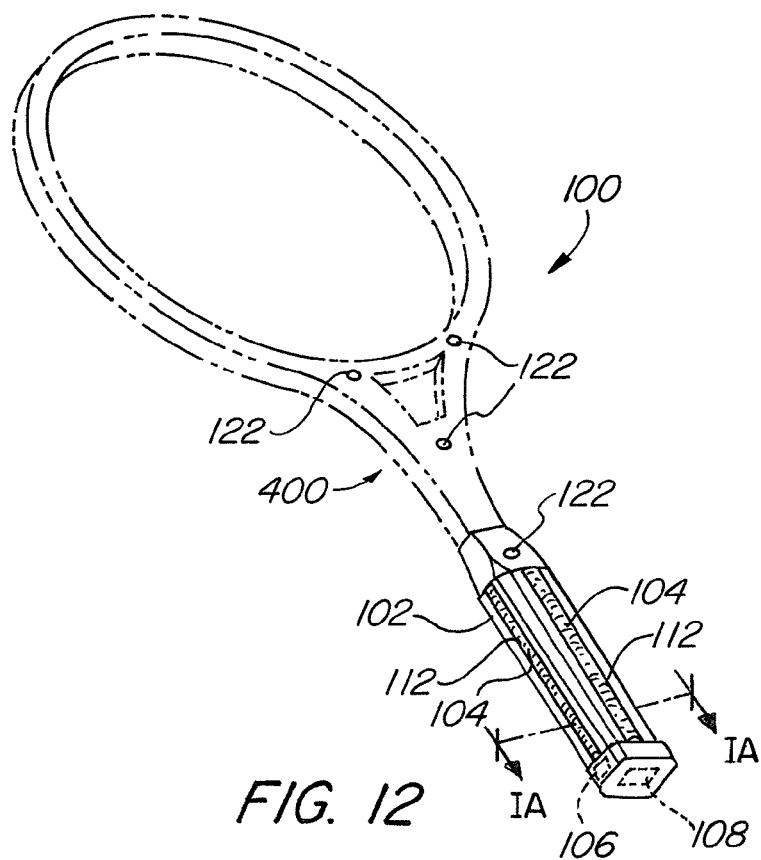
FIG. 12 is a perspective view of a damping device according to an exemplary embodiment of the present invention implemented into a tennis racket.

The inflation device 106 may be disposed in or on the handgrip 102 or in or on another part of the vibrating object. For example, as shown in FIG. 1, the inflation device 106 is disposed within the handgrip 102, and more specifically, within the stem 138 that is connected to the handgrip 102. In some embodiments, the inflation device 106 is permanently installed within or near the handgrip 102. For example, FIG. 8 shows the inflation device 106 installed within the handlebar 202 of a motorcycle. FIG. 9 shows the inflation device 106 disposed within one of the steering wheel spokes 302 of a vehicle steering wheel 300. In other embodiments, the inflation device 106 may be releasably attached to the handgrip 102 and connected to the controller 108. For example, the inflation device 106 shown in FIG. 1 may be installed on or in the stem 138 such that it is detachable. In FIG. 12, the damping device 100 is incorporated into a tennis racket 400. Here, the inflation device may be releasably attached to the handgrip 102, the butt (cap) of the tennis racket 400, or the throat of tennis racket 400. The releasable attachment capability provides for easy replacement of the inflation device 106 for maintenance or repair. Further, if the operator prefers not to use the damping device 100 during an instance of use of the object (e.g. tennis racket), the operator can turn the controller 108 off and remove the inflation device 106.

In some embodiments, the inflation device 106 has a small profile and requires little space such that it can be easily incorporated in or on the handgrip 102. This is useful in that some vibrating objects are themselves small and have minimal structural surface for placement of the inflation device. Examples of such vibrating objects include a tennis racket, golf club, and hammer. Where vibrating objects (and/or their handgrip) are small, the inflation device 106 may comprise a portable and disposable pressurized gas cartridge, such as an air cartridge or carbon dioxide ($CO_2$) cartridge. Air cartridges or $CO_2$ cartridges are often adapted in life jackets, airguns, and paintball markers as well as used for inflating bicycle tires. The pressurized gas cartridge is small and provides sufficient inflation and deflation capabilities to expand and contract the bladder 104 as appropriate. For instance, a $CO_2$ cartridge can be releasably disposed in the butt of the tennis racket 400, as shown in FIG. 12. Other examples of the inflation device 106 may include small medical-based pumps, such as insulin pumps and ventricular assist devices/pumps. In other embodiments, the inflation device 106 may have a larger size and be able to provide more inflation/deflation power and capabilities. Such an inflation device can be incorporated into the handgrip or other parts of a vibrating object that has a more substantial size. For instance, where the vibrating object is a car, the inflation device 106 can be disposed within the steering column or even under the hood. Additional examples of the inflation device 106, other than the $CO_2$ cartridge, include a compressor (e.g., air compressor, gas compressor) and a hydraulic pump.

As previously discussed, the controller 108 determines a volume of fluid and an inflation rate with which the bladder 104—and each of the inflatable compartments 120 therein—are to be inflated or deflated. These parameters are communicated to the inflation device 106 to control the manner in which it injects or removes fluid. In some embodiments, the fluid used to expand the bladder 104 is a gas. For example, air can be used to inflate the bladder 104. The fluid can be some other type of gas, such as nitrogen or carbon dioxide, either in a pressurized or non-pressurized state. In other embodiments, the fluid is a liquid. For example, water can be used to expand the bladder 104. In further embodiments, the fluid is a gel, composite material, or a silicone-based fluid material. The damping device 100 may include a storage tank for holding a supply of the fluid. With a feeding tube connected between the storage tank and the inflation device 106, fluid is passed to and from the inflation device 106. Alternatively, where air is used, a storage tank is not required. Instead, the inflation device 106 aspirates air from the outside environment into the bladder 104 (i.e., inflation) as well as releases air from inside the bladder 104 to the outside environment (i.e., deflation).

The inflation device 106 includes a two-way aspiration valve that is coupled to at least one inlet disposed in the bladder 104. The connection between the aspiration valve and the inlet provides a fluid-tight seal, preventing any leakage of fluid during either the inflation or deflation process. In some embodiments, one or more tubes are used to provide fluid channel between the aspiration valve and the inlet, as shown in FIG. 1. The aspiration valve regulates the directional flow of the fluid based on commands sent by the controller 108. During inflation, the inflation device 106 allows fluid to flow through the aspiration valve into the bladder 104 according to the calculated volume of fluid and inflation rate. Conversely, during deflation, the aspiration valve of the inflation device 106 releases fluid within the bladder 104. Where the damping device 100 has a storage tank, the fluid returns to the storage tank during deflation. In some embodiments, the inflation device 106 may be adapted with a separate discharge valve for communicating fluid out of the bladder 104. For example, where air is used as the fluid, the discharge valve releases the air back into the outside environment. In the embodiments where the bladder 104 comprises multiple isolated inflatable compartments 120, each compartment 120 has its own inlet that is in fluid communication with the inflation device 106. Accordingly, any fluid that passes to or from one compartment 120 will not disturb the cushion pressure of other compartments 120.

Further, the inflation device 106 is adapted to efficiently pump fluid into the bladder 104. The inflation device 106 is capable of having adjustable pumping characteristics or ratings. This provides for the implementation of different inflation rates and pumping power to achieve vibration and impact pressure damping and cushion pressure sufficient to protect the upper extremities. Depending on the characteristics of the vibration or impact transmitted through the object, the controller 108 causes the inflation device 106 to make the necessary changes to the volume of fluid contained within the bladder 104 to achieve sufficient cushion pressure. Other factors may also affect the pumping characteristics of the inflation device 106, such as position of the operator's upper extremities, and more specifically the operator's hands, on the handgrip 102. A plurality of grip sensors disposed on the handgrip 102 and/or embedded within the bladder 104 are adapted to detect external pressure that is applied on the handgrip 102 and bladder 104 and determine the exact location where the hands are grasping the handgrip 102. Examples of the grip sensors include pressure sensors and piezoelectric sensors. In addition, the grip sensors are adapted to measure the external pressure and force exerted on the handgrip 102 and bladder 104 by the operator's hands (i.e., how tightly the operator is holding onto the handgrip). This data is subsequently communicated to the controller 108 to calculate more accurately the cushion pressure and volume of fluid to be disposed within the bladder 104). Accordingly, the controller 108 can determine one cushion pressure value when the operator is gripping the handgrip 102 loosely and another cushion pressure when the operator is firmly gripping the handgrip 102, even if all other conditions are the same.

In some embodiments, the inflation device 106 comprises an electric pump. In yet other embodiments, the inflation device 106 is a manual hand pump requiring compressions by the operator in order to inflate the bladder 104. When a manual pump is used as the inflation device 106, the controller 108 is adapted to provide feedback indication to the operator when sufficient cushion pressure is achieved and pumping action by the operator may cease. The feedback indication may comprise a tone or audible alert sound in some embodiments of the damping device 100. In other embodiments, the feedback indication may comprise a visual indicator, such as a status light disposed on the handgrip 102. In still other embodiments, the feedback indication comprises both an audible alert sound and a visual indicator to notify the operator when the bladder 104 has been inflated or deflated with the proper amount of fluid to achieve sufficient vibration damping.

As shown in FIGS. 1-3, the damping device 100 may further include one or more vibration sensors 122 disposed at least on the handgrip 102. In some embodiments, the vibration sensors 122 may be disposed on other parts of the vibrating object as well. For example, the vibration sensors 122 may be disposed on other parts of the bicycle, including the bicycle frame, front fork, head tube, and seat post. Similarly, if the damping device 100 was implemented on the steering wheel 300 of a motor vehicle (FIG. 9), the vibration sensors 122 may be placed throughout the vehicle, including the front and rear bumpers, the side doors, rooftop, wheels, and steering column. The vibration sensors 122 are adapted to detect vibrations, impacts and shocks in the object, and specifically the handgrip 102. Upon detecting at least one of vibrations and impact pressure, the sensors 122 transmit a signal to the controller 108 indicating the presence of vibrations, impacts, and/or shocks and the need for attenuation thereof. The vibration sensors 122 are further adapted to measure characteristics of the vibrations, impacts, and shocks. In particular, the sensors 122 can measure at least the frequency and amplitude of the vibrations. The vibration sensors 122 may further measure wavelength, period, waveform, spectra, impulsiveness, and pressure of the vibrations. Still further, the plurality of sensors 122 may determine a point of origin and a direction of travel of the vibrations. Any one of the above characteristics provides relevant information for making adjustments in the cushion pressure of the bladder 104 to sufficiently protect the upper extremities.

In some embodiments, the vibration sensors 122 comprise microelectromechanical system (MEMS) technology. In other embodiments, the vibration sensors 122 comprise nanoelectromechanical system (NEMS) technology. In order to transmit data to the controller 108, signal cables may be connected between each of the sensors 122 and the controller 108. Other embodiments of the damping device 100 utilize wireless communication for the sensors 122 to share data with the controller 108. Such wireless communication may comprise radio frequency communication, infrared short-range communication or Bluetooth.

FIG. 8 illustrates the damping device 100 implemented into the handgrip 102 of a motorcycle handlebar 202. The damping device 100 comprises at least one bladder 104 disposed inside the interior of the handgrip 102, which has at least one aperture 112 to accommodate the at least one bladder 104. An inflation device 106 and a controller 108 are also disposed near the handgrip 102 in the handlebar 202. The controller 108 receives data from vibration sensors 122 located on the handgrip 102 as well as sensors disposed on other parts of the motorcycle (e.g., handlebar, wheels, seat area, front fork, frame). Further, a selector 124 is positioned on the handlebar 202 for easy manipulation by the thumb of the operator. The operator, therefore, can make adjustments to the controller 108 and the damping device 100 as a whole without having to release his or her grip over the handgrip 102.

FIG. 9 illustrates the damping device 100 implemented into the steering wheel 300 of a motor vehicle, such as a car. The aperture 112 in this case extends at least partially the circumference of the steering wheel handgrip 102. The spokes 302 of the steering wheel 300 may be adapted to house the inflation device 106, controller 108, and the vibration sensors 122. In some embodiments, any one of the inflation device 106, controller 108, and vibration sensors 122 may be disposed within the steering hub 304. The selector 124 may be disposed on one or more of the spokes 302 for easy reach by the operator.

Figure 10:
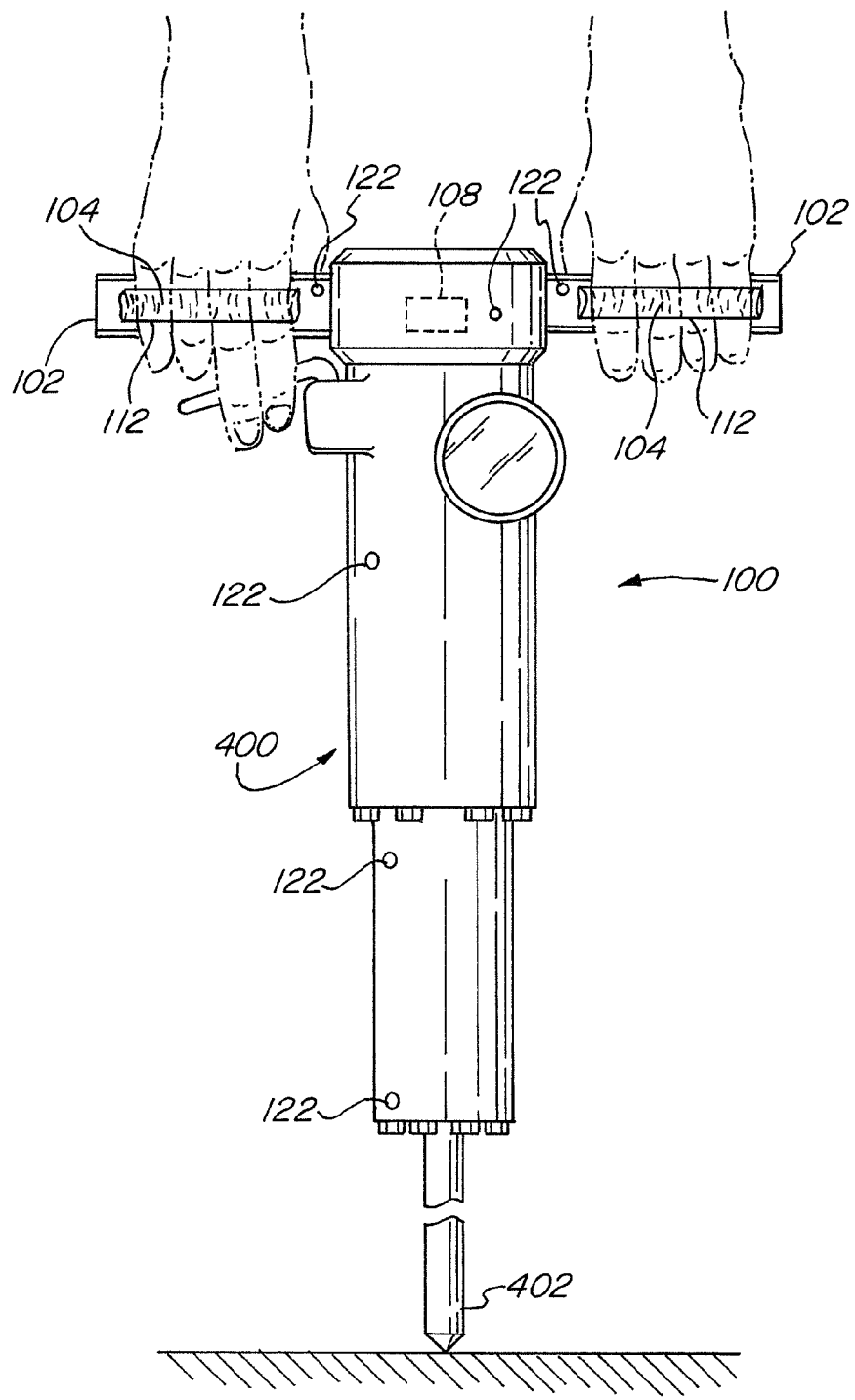
FIG. 10 is a perspective view of a damping device according to an exemplary embodiment of the present invention implemented into a construction tool.
Figure 11:
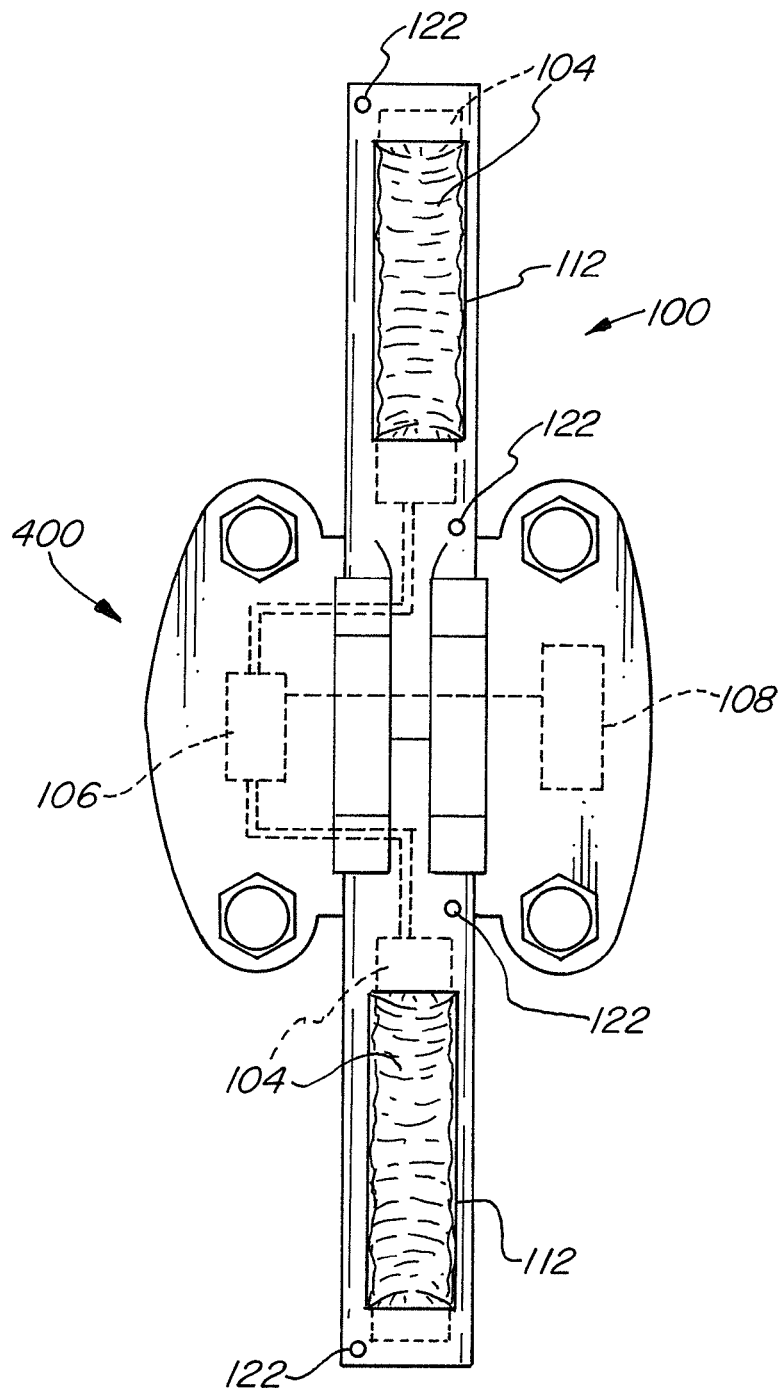
FIG. 11 is a top view of the damping device of FIG. 10 implemented into a construction tool.

FIGS. 10-11 illustrate the damping device 100 implemented into a construction tool, and more specifically a jackhammer 400. The vibration sensors 122 measure the characteristics of the vibrations created when the hammer/chisel 402 impacts rock, pavement, or concrete. The controller 108 utilizes the data measured by the vibration sensors 122 to calculate a volume of fluid and inflation rate with which the inflation device 106 needs to inflate or deflate the bladder 104 to provide sufficient vibration damping and cushion pressure for the upper extremities.

Figure 13:
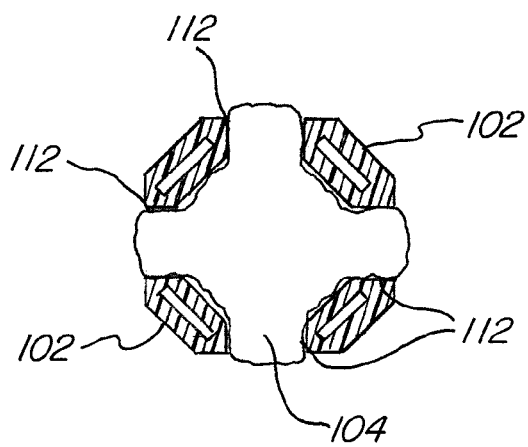
FIG. 13 is cross-sectional view of the damping device of FIG. 12 along the line IA-IA.

FIGS. 12-13 illustrate the damping device 100 implemented into a sport equipment, and specifically a tennis racket 500. As shown, the handgrip 102 has four apertures 112 extending substantially the length of the handgrip 102. The damping device 100 comprises one bladder 104 disposed within the handgrip 102 and adapted to expand or contract from each of the apertures 112. The controller 108 and the inflation device 106 are disposed at the butt of the tennis racket 500. Further, vibration sensors 122 are located on the handgrip 102 and the throat of the tennis racket 500.

While the invention has been specifically described in connection with certain specific embodiments thereof, it is to be understood that this is by way of illustration and not of limitation and that various changes and modifications in form and details may be made thereto, and the scope of the appended claims should be construed as broadly as the prior art will permit.

The description of the invention is merely exemplary in nature, and thus, variations that do not depart from the gist of the invention are intended to be within the scope of the invention. Such variations are not to be regarded as a departure from the spirit and scope of the invention.

What is claimed is:

1. A handgrip having a damping device, the damping device comprising:
   a bladder disposed in said handgrip;
   an inflation device in fluid communication with said bladder; and
   a controller adapted to detect at least one of vibrations and impact pressure, and automatically adjust a cushion pressure of said bladder by causing the inflation device to inflate or deflate the bladder with a fluid as appropriate in order to attenuate the at least one of vibrations and impact pressure transmitted through said handgrip.

2. The handgrip of claim 1, wherein the handgrip has at least one aperture for accommodating the bladder, the bladder being adapted to expand out of or contract from said handgrip through said aperture when the bladder is respectively inflated or deflated with said fluid.

3. The handgrip of claim 2, wherein the aperture comprises a plurality of apertures disposed at different locations along the handgrip, said apertures providing access through which the bladder expands or contracts.

4. The handgrip of claim 1, wherein said inflation device is removably attached to said handgrip.

5. The handgrip of claim 1, wherein said inflation device is integrated with said handgrip.

6. The handgrip of claim 1, wherein said inflation device comprises a pressurized gas cartridge.

7. The handgrip of claim 6, wherein said pressurized gas cartridge comprises a carbon dioxide cartridge.

8. The handgrip of claim 6, wherein said pressurized gas cartridge comprises an air cartridge.

9. The handgrip of claim 1, wherein said inflation device comprises a compressor.

10. The handgrip of claim 1, wherein said inflation device comprises a hydraulic pump.

11. The handgrip of claim 1, wherein the bladder comprises a plurality of inflatable compartments, each compartment having fluid communication with said inflation device, said controller causing said inflation device to increase or decrease inflation of the compartments.

12. The handgrip of claim 11, wherein each compartment is isolated and has independent fluid communication with said inflation device.

13. The handgrip of claim 11, wherein each compartment is adapted to have different cushion pressure.

14. A handgrip having a damping device, the damping device comprising:
a bladder disposed in said handgrip, said handgrip having at least one aperture for accommodating said bladder;
at least one sensor disposed on said handgrip, said sensor adapted to measure characteristics of at least one of vibrations and impact pressure transmitted through said handgrip;
an inflation device in fluid communication with the bladder; and
a controller adapted to automatically adjust a cushion pressure of said bladder by causing the inflation device to inflate or deflate the bladder with a fluid as appropriate in order to attenuate the at least one of vibrations and impact pressure, said controller adjusting said cushion pressure according to said characteristics.

15. The handgrip of claim 14, wherein said controller adjusts the cushion pressure of said bladder according to a grip pressure exerted on said bladder by at least one hand gripping said handgrip.

16. The handgrip of claim 14, wherein said characteristics comprise frequency and amplitude of said at least one of vibrations and impact pressure.

17. The handgrip of claim 14, further comprising a selector disposed on said handgrip, said selector being connected to the controller, wherein said selector is adapted to adjust the cushion pressure of said bladder.

18. The handgrip of claim 14, wherein the bladder comprises a plurality of inflatable compartments, each compartment being isolated and having independent fluid communication with said inflation device, said controller causing said inflation device to increase or decrease inflation of each compartment.

19. The handgrip of claim 14, wherein the bladder is adapted to expand outward or contract inward with respect to an axis of said handgrip.

20. A handgrip having a damping device, the damping device comprising:
at least one bladder disposed in said handgrip, said handgrip having a plurality of apertures for accommodating said bladder, said apertures are disposed substantially where fingers grip said handgrip;
at least one inflation device in fluid communication with the bladder; and
a controller adapted to detect at least one of vibrations and impact pressure, and automatically adjust a cushion pressure of said bladder by causing the inflation device to inflate or deflate the bladder with a fluid as appropriate in order to attenuate the at least one of vibrations and impact pressure transmitted through said handgrip.

21. The handgrip of claim 20, wherein said apertures are adapted as finger grooves for said handgrip.

22. The handgrip of claim 20, further comprising a bladder for each aperture in said handgrip, each bladder being in independent fluid communication with said inflation device.

23. A handgrip having a damping device, the damping device comprising:
a bladder disposed in said handgrip;
an inflation device in fluid communication with said bladder;
at least one sensor for detecting and measuring at least one of vibrations and impact pressure transmitted through said handgrip;
a manual adjuster adapted to allow a user to adjust a cushion pressure of said bladder by causing the inflation device to inflate or deflate the bladder with a fluid; and
a controller adapted to provide a feedback indication to the user that said bladder has been inflated or deflated by an amount which attenuates the at least one of vibrations and impact pressure and which corresponds to a grip pressure exerted on said bladder by a hand of the user.

24. The handgrip of claim 23, wherein the handgrip has at least one aperture for accommodating the bladder, the bladder being adapted to expand out of or contract from said handgrip through said aperture when the bladder is respectively inflated or deflated with said fluid.

25. The handgrip of claim 23, wherein the bladder comprises a plurality of inflatable compartments, each compartment having fluid communication with said inflation device, said adjuster causing said inflation device to increase or decrease inflation of the compartments.

26. The handgrip of claim 25, wherein each compartment is isolated and has independent fluid communication with said inflation device.

27. The handgrip of claim 23, wherein said at least one sensor is adapted to measure characteristics of said at least one of vibrations and impact pressure, and wherein said feedback is based on said characteristics.

28. The handgrip of claim 27, wherein said characteristics comprise frequency and amplitude of said at least one of vibrations and impact pressure.

29. A handgrip having a damping device, the damping device comprising:
a bladder disposed in said handgrip, said handgrip having at least one aperture for accommodating said bladder;
at least one sensor disposed on said handgrip, said sensor adapted to measure characteristics of at least one of vibrations and impact pressure transmitted through said handgrip;
an inflation device in fluid communication with the bladder; and
a controller adapted to automatically adjust a cushion pressure of said bladder by causing the inflation device to inflate or deflate the bladder with a fluid as appropriate in order to attenuate the at least one of vibrations and impact pressure, said controller adjusting said cushion pressure according to said characteristics;
wherein said controller adjusts the cushion pressure of said bladder according to a grip pressure exerted on said bladder by at least one hand gripping said handgrip.

30. A handgrip having a damping device, the damping device comprising:
at least one bladder disposed in said handgrip, said handgrip having a plurality of apertures for accommodating said bladder, said apertures are disposed substantially where fingers grip said handgrip;

at least one inflation device in fluid communication with the bladder; and a controller adapted to detect at least one of vibrations and impact pressure, and automatically adjust a cushion pressure of said bladder by causing the inflation device to inflate or deflate the bladder with a fluid as appropriate in order to attenuate the at least one of vibrations and impact pressure transmitted through said handgrip;

wherein said at least one bladder comprises a bladder for each aperture in said handgrip, each bladder being in independent fluid communication with said inflation device.

\* \* \* \* \*